United States Patent [19]

Tuchiya et al.

[11] Patent Number: 4,729,592
[45] Date of Patent: Mar. 8, 1988

[54] CONVERTIBLE VEHICLE BODY STRUCTURE

[75] Inventors: Takanori Tuchiya; Takeshi Yamamoto; Takeshi Konishi; Iseo Hamasaki, all of Hiroshima, Japan

[73] Assignee: Mazda Motor Corporation, Hiroshima, Japan

[21] Appl. No.: 932,793

[22] Filed: Nov. 20, 1986

[30] Foreign Application Priority Data

Nov. 20, 1985 [JP] Japan ................. 60-260839

[51] Int. Cl.⁴ ............................................. B60J 7/08
[52] U.S. Cl. ................................. 296/116; 296/107; 296/117
[58] Field of Search ............... 296/107, 108, 116, 117, 296/186, 146

[56] References Cited

U.S. PATENT DOCUMENTS

| | | | |
|---|---|---|---|
| 2,157,783 | 5/1939 | Bessonneau | 296/117 X |
| 2,272,299 | 2/1942 | Ingildsen et al. | 296/117 |
| 2,596,355 | 5/1952 | Ackermans | 296/117 X |
| 2,939,742 | 7/1960 | Dardarian et al. | 296/107 |
| 4,557,502 | 12/1985 | Scaduto et al. | 280/756 |

FOREIGN PATENT DOCUMENTS

| | | |
|---|---|---|
| 59-48230 | 3/1984 | Japan . |
| 59-133375 | 9/1984 | Japan . |
| 2086316 | 5/1982 | United Kingdom . |

*Primary Examiner*—Dennis H. Pedder
*Attorney, Agent, or Firm*—Fleit, Jacobson, Cohn & Price

[57] ABSTRACT

A convertible vehicle body including a swingable pillar structure for supporting a front roof panel movably between an extended position and a retracted position. A rear side panel or a rear fender panel assembly has a rear side glass panel and a side door has a transparent glass panel. The rear side glass panel has a front edge which is located outside the pillar structure and in an abutting relationship with a rear edge of the transparent glass panel in the side door. Thus, the pillar structure is covered by the transparent glass panels to provide a good appearance.

10 Claims, 15 Drawing Figures

CONVERTIBLE VEHICLE BODY STRUCTURE

BACKGROUND OF THE INVENTION

1. Field of the Invention

The present invention relates to a vehicle body structure, and more particularly to a convertible type vehicle body structure.

2. Description of the Prior Art

In the British Pat. No. 2,806,316, there is shown a convertible type vehicle body having a removably installed rigid roof panel. The roof panel is supported at the front edge by the upper edge of the front windshield panel and at the rear edge by an inverted U-shaped swingable pillar member which has a pair of leg portions pivotably mounted on the rear side panels of the vehicle body. Between the pillar member and the rear body section, there is a foldable hood which is provided with a transparent rear window.

This type of convertible vehicle body has a problem of ensuring a widest possible rear view because the size of the transparent rear window is relatively limited and the substantial part of the rear portion is covered by the non-transparent hood. This problem is solved by the U.S. Pat. No. 4,557,502 which discloses a structure including an inverted U-shaped swingable pillar as in the structure of the British patent. According to the structure proposed by the U.S. patent, it is understood that a transparent rear windshield is built in the swingable pillar structure and a substantially horizontal rear deck is provided rearwards the swingable pillar. At the opposite sides of the rear deck, there are provided substantially triangular wings which stand with the upper edges inclining downward toward rearwards so that a smooth side body contour is provided. The wings are foldable over the rear deck which is adapted to be placed over the swingable pillar after the swingable pillar is retracted rearward. The structure proposed by the U.S. patent is acceptable in respect of the rearward view, however, there is a problem in respect of the appearance. Further, the proposed structure cannot provide a smooth outer body surface so that it is disadvantageous in respect of the aerodynamic property.

SUMMARY OF THE INVENTION

It is therefore an object of the present invention to provide a convertible type vehicle body structure which has a satisfactory rear view as well as a smooth aerodynamic outer surface.

Another object of the present invention is to provide a convertible type vehicle body structure which has a removable rigid roof panel supported by an inverted U-shaped swingable pillar and a retractable rear windshield structure but can provide a wide rear view and a smooth aerodynamic outer surface.

A further object of the present invention is to provide a convertible type vehicle body structure which has transparent rear side panels which are substantially flush with the window glasses in the vehicle side door assemblies.

According to the present invention, the above and other objects can be accomplished by a convertible vehicle body structure including a front windshield structure having an upper edge, a rear body section having a pair of rear side panel structures provided at the opposite side portions of the rear body section, said rear side panel structure having an upper edge defining a belt line of the vehicle body structure and a front edge defining a rear lower edge of a side door opening, a substantially U-shaped swingable pillar structure having a pair of leg portions pivotably mounted on the side panel structures so that the pillar structure is movable between an upright position wherein it stands from the side panel structures in an inverted U-shaped form and a retracted position wherein it is retracted in the rear body section, a substantially rigid roof panel having a front edge portion adapted to be removably attached to the upper edge of the front windshield, said roof panel being adapted to be supported by said pillar structure when the pillar structure is in the upright position, a transparent rear side window adapted to extend upward from the side panel structure beyond the upper edge of the side panel structure, a side door provided in each of the door opening and having a transparent panel located at an upper portion of the side door, said rear side window being located transversely outside the leg of the pillar structure and being substantially flush with the transparent panel when the side door is closed with a front edge of the rear side window being extending substantially along a rear edge of the transparent panel of the side door.

According to the features of the present invention, the swingable pillar is covered by the rear side window and the transparent panel in the side door when the roof is installed and the side door is closed. It is therefore possible to obtain an improved appearance. It should further be noted that the rear side window is substantially flush with the transparent panel of the side door so that an improved aerodynamic property can be obtained. Although the inverted U-shaped pillar structure is preferable, it may be substituted by a pair of swingable pillars which support the roof panel at the upper ends.

The above and other objects and features of the present invention will become apparent from the following descriptions of a preferred embodiment taking reference to the accompanying drawings.

DESCRIPTION OF THE PREFERRED EMBODIMENT

Figure 1:
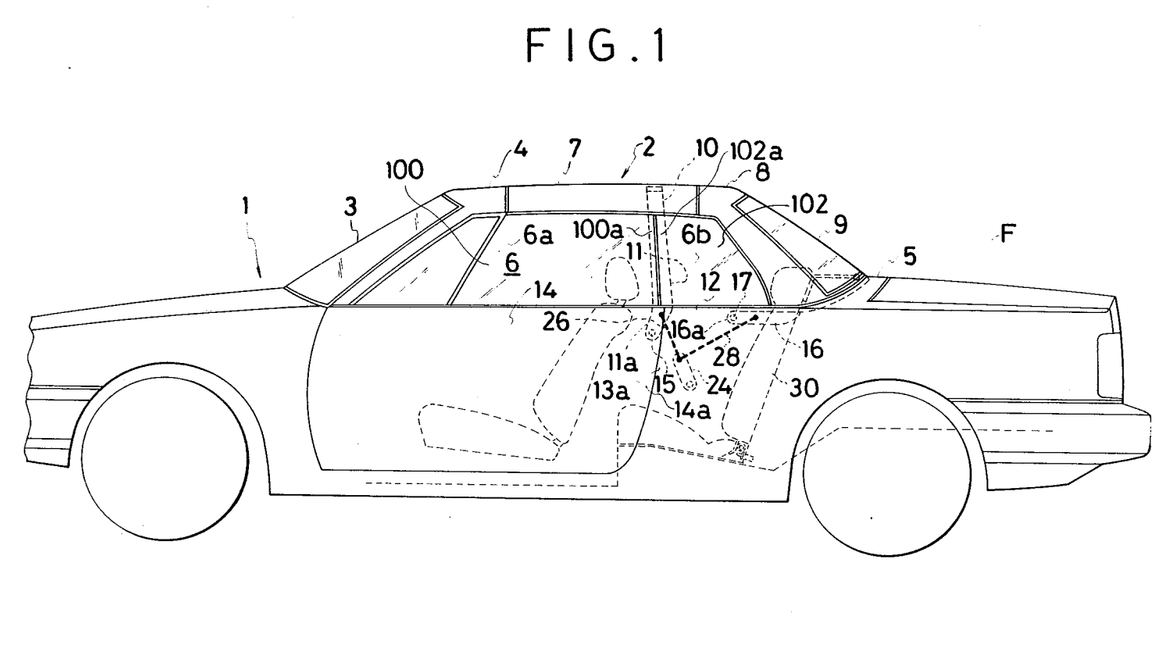
FIG. 1 is a side view of a convertible type vehicle in accordance with one embodiment of the present invention.
Figure 6:
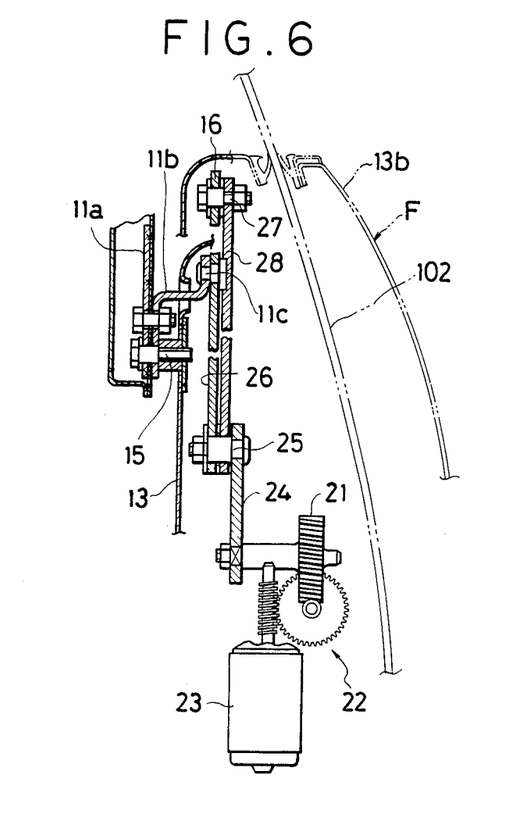
FIG. 6 is a sectional view taken along the line B—B in FIG. 5.
Figure 7:
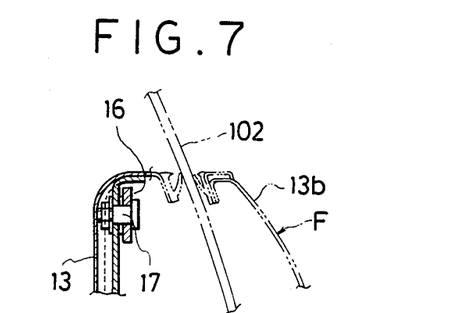
FIG. 7 is a sectional view taken along the line A—A in FIG. 5.
Figure 11:
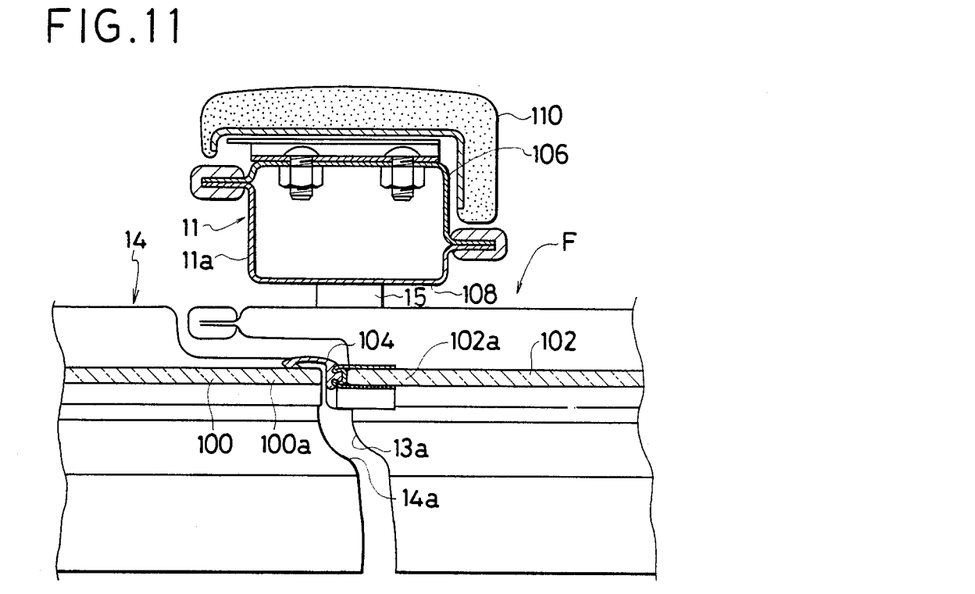
FIG. 11 is a sectional view taken along the line XI—XI in FIG. 9.

Referring to the drawings, particularly to FIG. 1, there is shown a convertible type vehicle body 1 including a front windshield 3 having an upper edge portion or front header 4. The vehicle body 1 further includes a rear body section 5 which has a pair of rear fender panel assemblies F having an upper edge 12 defining a vehicle belt line. As shown in FIGS. 6 and 7, the rear fender panel assembly F is constituted by an inner panel 13 and outer panel 13b. Referring to FIG. 11, it will be noted that the rear fender panel assembly F has a front edge portion 13a of a stepped configuration which defines a rear edge of a side door opening. In the side door opening, there is provided a side door 14 having a rear edge portion 14a of a cross-section which is complimentary to the cross-section of the front edge portion of the rear fender panel F. There is provided a roof structure 2 which includes a front roof section 7 and a rear roof section 8 having a transparent rear windshield glass 9.

Figure 2:
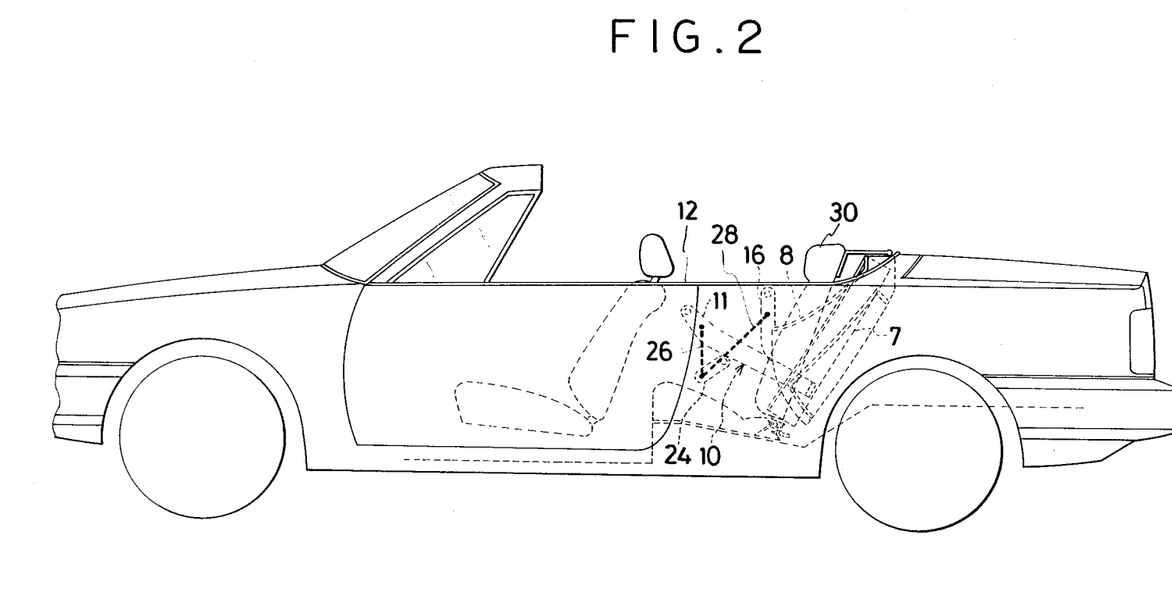
FIG. 2 is a side view of the vehicle shown in FIG. 1 but shown in an open-top condition.

The front roof section 7 is separated from the rear roof section 8 and supported by a swingable pillar structure 10 of a substantially inverted U-shaped configuration. The pillar structure 10 has a pair of leg portions 11 extending downward from the intermediate portion which is secured to the front roof portion 7. The leg portion 11 has a lower end 11a which is slightly forwardly bent and pivotably attached to the front edge portion 13a of the rear fender panel assembly F by means of a shaft 15 as shown in FIG. 11. It will be noted that the pillar structure 10 may not necessarily be of an inverted U-shaped configuration but it may be substituted by a pair of supporting legs. The pillar structure 10 is swingable between an upright position as shown in FIG. 1 and a retracted position as shown in FIG. 2. In the upright position, the pillar structure 10 stands substantially upright and supports the front roof panel 7 in a position wherein the roof panel 7 covers a front part 6a of a passanger compartment 6. In the retracted position, the pillar structure 10 is retracted into the rear body section until the front roof panel 7 is housed in the rear body section.

Figure 3:
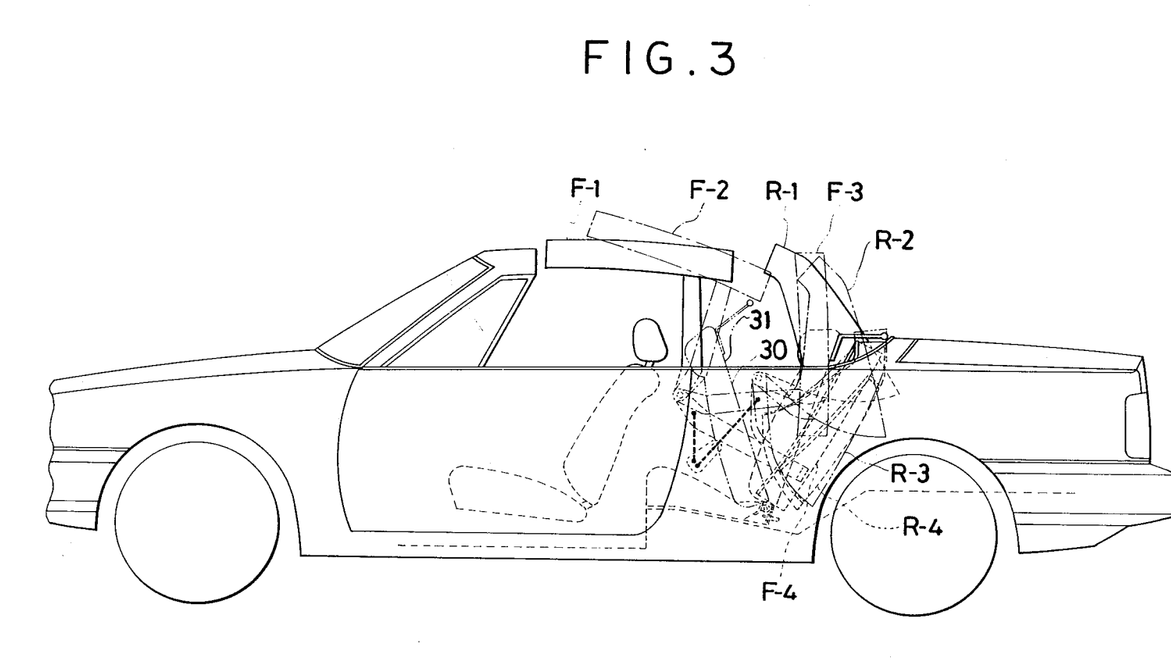
FIG. 3 is a side view showing the movements between the open and closed conditions.

As shown in FIG. 1, the rear roof panel 8 is provided at a lower portion of each side with a forwardly extending attachment arm 16 having a forward end portion 16a pivotably attached to the inner panel 13 of the rear fender panel assembly F by means of a pivot pin 17. The rear roof panel 8 is therefore swingable about the pivot pin 17 between an erected position as shown in FIG. 1 and a retracted position as shown in FIG. 2. In the erected position, the rear roof panel 8 covers a rear portion 6b of the passanger compartment 6 and provides a continuous roof structure together with the front roof panel 7. In the retracted position, the rear roof panel 8 is retracted in the rear body section. It will be noted that in the retracted positions, the front roof panel 7 and the rear roof panel 8 are jaxtaposed in a fore-and-aft relationship with each other in the rear body section so that the passanger compartment 6 is completely opened. FIG. 3 shows sequential steps for moving the roof panels 7 and 8 from the erected positions to the retracted positions.

Figure 5:
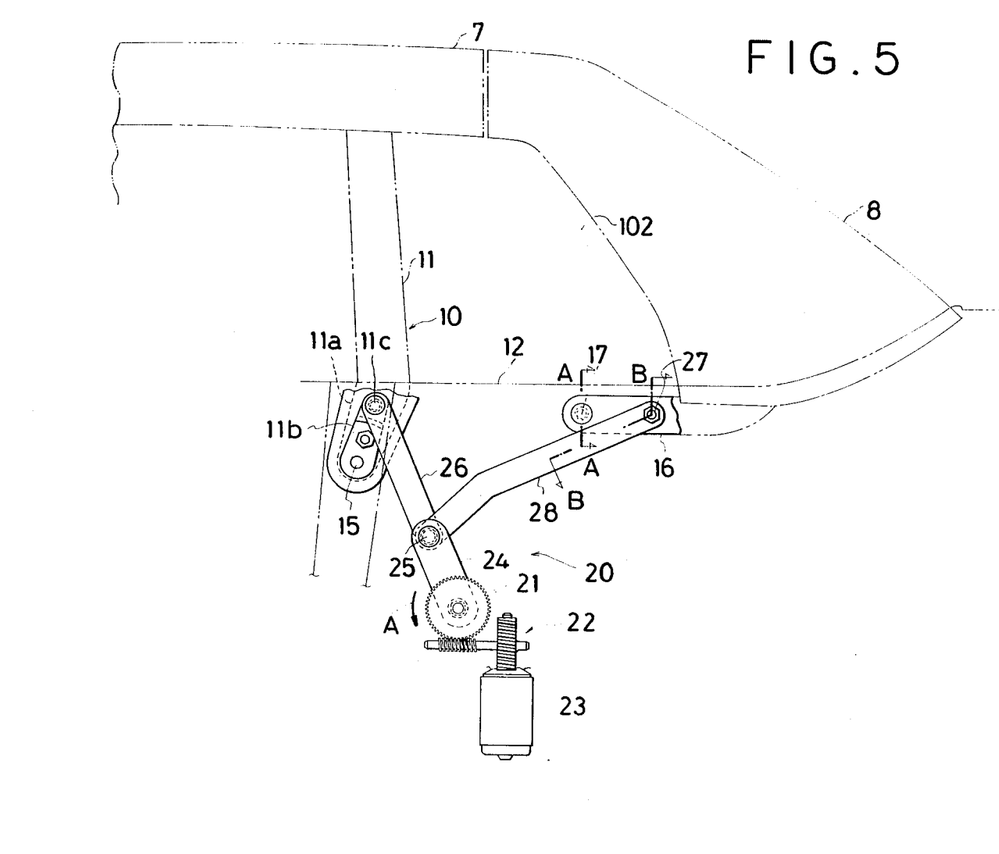
FIG. 5 is a side view showing essential parts of the roof actuating mechanism.

Referring to FIG. 5, there is shown a driving mechanism 20 for driving the roof panels 7 and 8 between the erected positions and the retracted positions. The driving mechanism 20 includes a driving gear 21 which is mounted on the rear fender panel assembly F and driven by an electric motor 23 through a worm gear device 22. The driving gear 21 is provided with a driving link arm 24 which is secured to the gear 21 at one end. The other end of the link arm 24 is pivotably connected through a pivot pin 25 with first link 26 and a second link 28.

An arm 11b is secured at one end to the lower end portion 11a of the legs 11 of the pillar structure 10. The other end of the arm 11b is pivotably connected through a pivot pin 11c with a free end of the link arm 26. The link arm 28 is pivotably connected at the free end with the arm 16 on the rear roof panel 8 through a pivot pin 27 at a position rearward the pivot pin 17. As shown in FIG. 6, the driving mechanism 20 is located between the inner panel 13 and the outer panel 13b of the rear fender panel assembly F and mounted on the inner panel 13. The arm 11b which is attached to the leg 11 of the pillar structure 10 extends through a slot formed in the inner panel 13.

Figure 4:
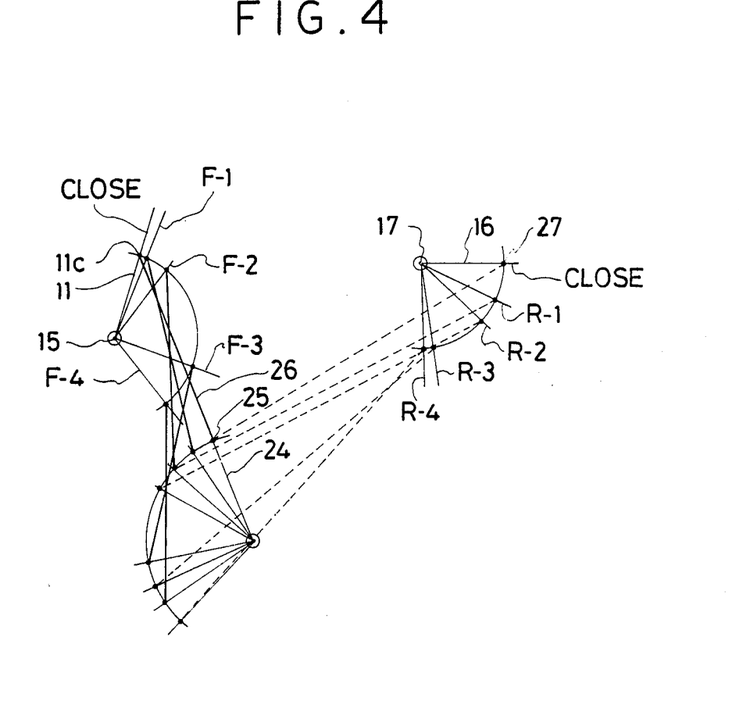
FIG. 4 is a side view showing the operation of the link mechanism.

In the erected position of the front roof panel 7, the link arms 24 and 26 align in a line as shown in FIG. 5 so that the pillar structure 10 is forced to the erected position. In the erected position of the rear roof panel 8, the link arm 28 extends substantially perpendicularly to the link arm 24. The link arm further extends so that it makes a small angle with the arm 16. For retracting the roof panels, the motor 23 is actuated to rotate the link arm 24 in the direction as shown by an arrow A. Due to the geometrical arrangement, the swingable movement of the pillar structure 10 is relatively small in the initial stage of the rotation of the link arm 24. The link arm 28 is however moved relatively rapidly so that the rear roof panel is started to be retracted more rapidly than the front roof panel 7. The positions of the roof panels 7 and 8 in the initial stage of the retracting movements are shown by F-1 and R-1 in FIG. 3. Thereafter, the roof panels 7 and 8 are moved to positions F-2 and R-2 and to positions F-3 and R-3. The completely retracted positions are shown by F-4 and R-4. FIG. 4 shows the operations of the link arms.

Figure 8:
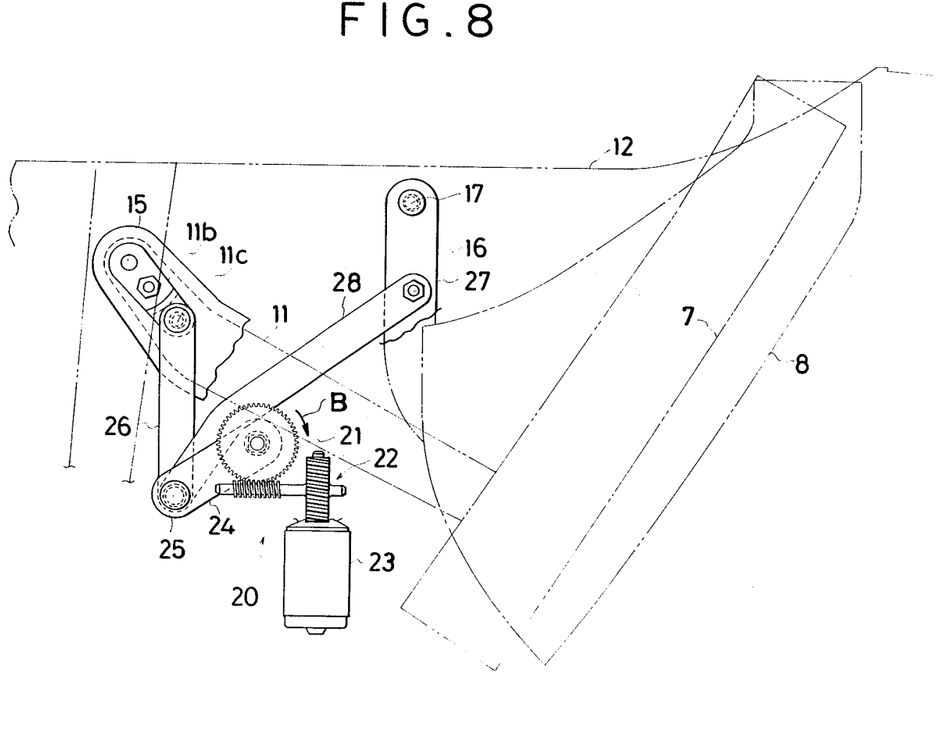
FIG. 8 is a fragmentary illustration of the roof actuating mechanism.
Figure 9:
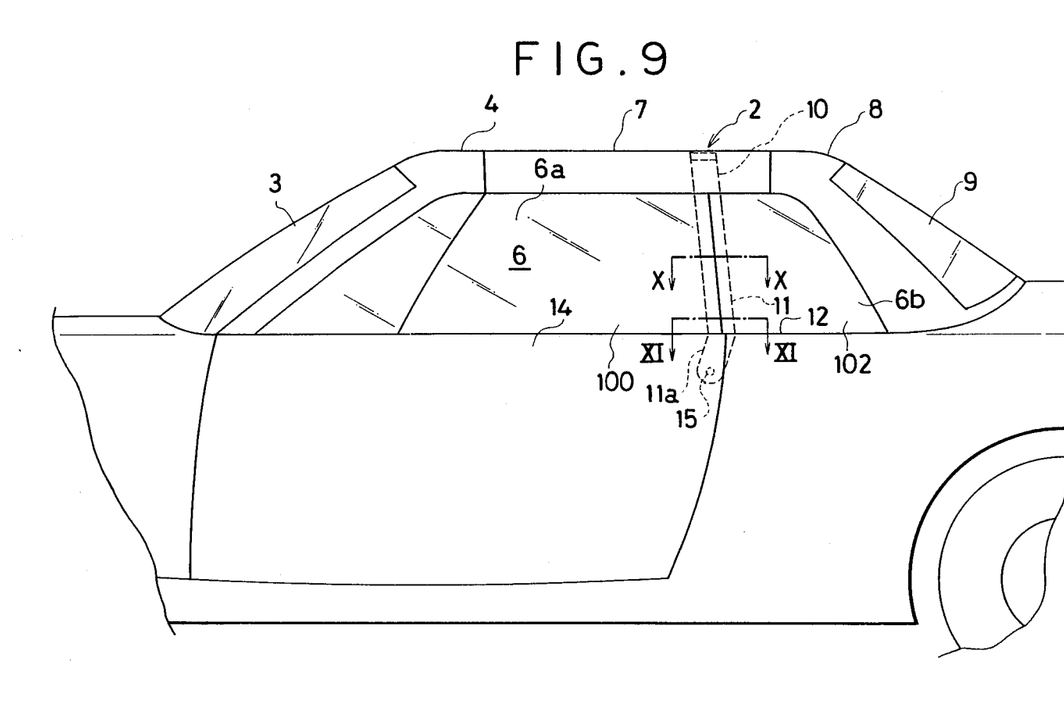
FIG. 9 is a fragmentary side view of the vehicle shown in FIG. 1.

In the retracted position, the link arm 26 makes a relatively large angle with the driving arm 24 whereas the link arm 28 makes a small angle with the driving arm 24 as shown in FIG. 8. It will therefore be understood that when the arm 24 is rotated in the direction shown by an arrow B in FIG. 8 to move the roof panels to the extended positions, the arm 28 is moved relatively slowly in the initial stage of the movement as compared with the link arm 26. Therefore, the front roof panel 7 is moved faster than the rear roof panel 8. In case where rear passenger seats 30 are provided as in the illustrated embodiment, it would be preferable to fold the seat backs 31 forwardly as shown in FIG. 3.

Figure 10:
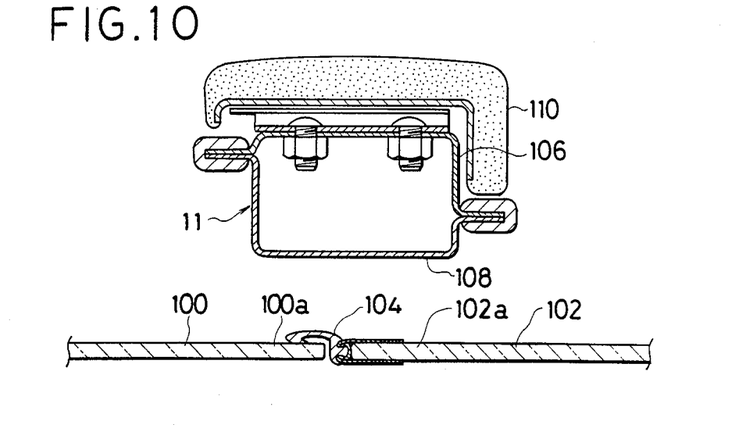
FIG. 10 is a sectional view taken along the line X—X in FIG. 9.

It will be noted that as shown in FIGS. 1, 6 and 7, a rear quarter glass panel 102 is provided in the rear fender panel assembly F. The rear quarter glass panel 102 is movable between the extended position as shown in FIG. 1 and a retracted position wherein it is completely retracted into the rear fender panel assembly F. The side door assembly 14 further has a door glass 100 which is also retractable into the door panel. Suitable glass actuating mechanisms may be provided in the rear fender panel assembly F and the side door assembly 14. Referring now to FIGS. 10 and 11, it will be noted that the door glass 100 has a rear edge portion 100a which is located transversely outside the pillar structure 10 in the erected position. The rear quarter glass panel 102 has a front edge portion 102a which is also located outside the pillar structure 10 and extends along the rear edge portion 100a of the door glass 100. The rear quarter glass panel 102 is flush with the door glass at the front edge portion 102a and the front edge portion 102a is in an abutting relationship with the rear edge portion 100a of the door glass 100 with a small gap therebetween. A weather strip 104 is provided along the front edge portion 102a of the rear quarter glass panel 102. The weather strip 104 is brought into contact with the rear edge portion 100a of the door glass 100 to provide a weather-tight seal between the glasses 100 and 102 when the roof panels 7 and 8 are erected.

In FIGS. 10 and 11, it will further be noted that the pillar structure 10 is constituted by an inner panel 106 and an outer panel 108 which are connected together at the front and rear edges to form a structure of a closed cross-section. An inner trim panel 110 is attached to the inner panel 106.

Figure 12:
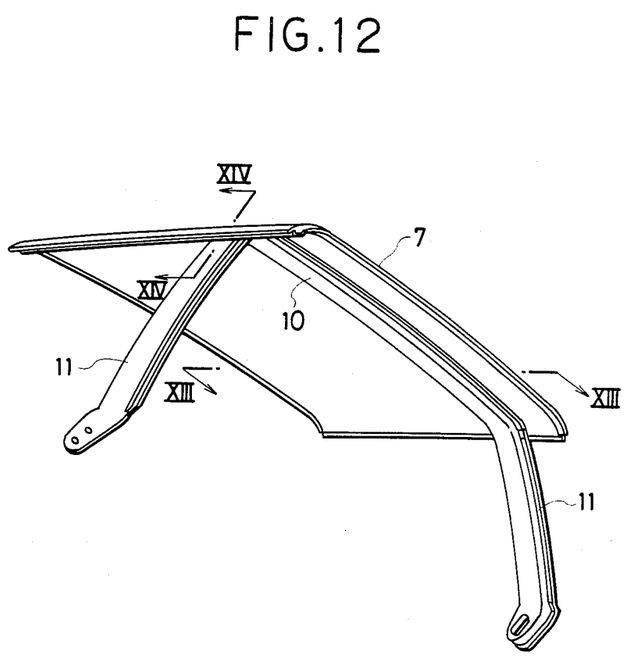
FIG. 12 is a perspective view showing the details of the roof panel.
Figure 13:
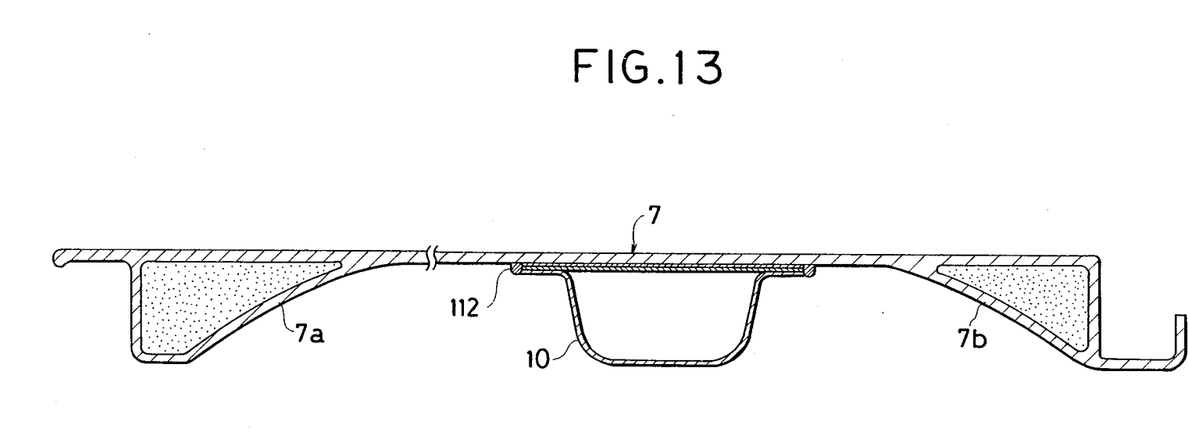
FIG. 13 is a sectional view taken along the line XIII—XIII in FIG. 12.
Figure 14:
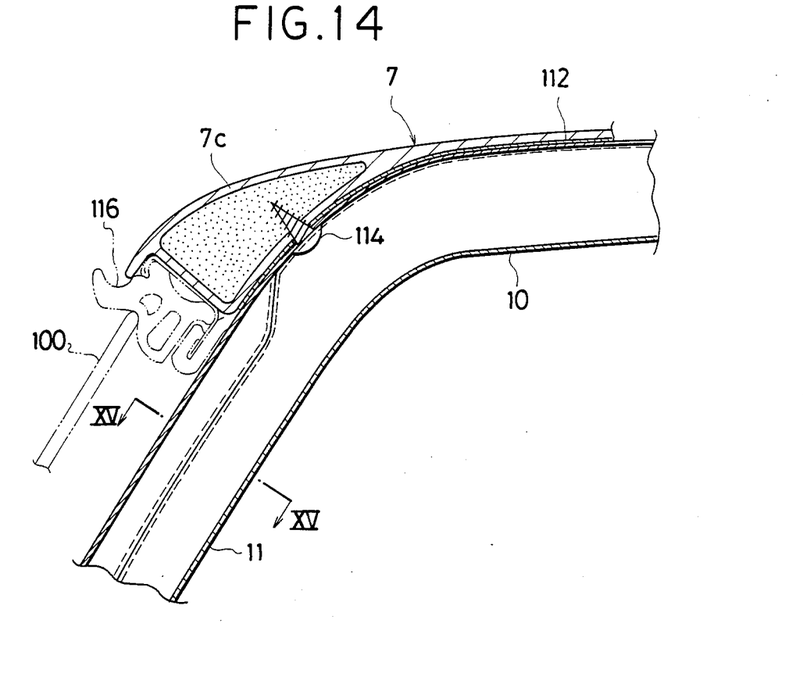
FIG. 14 is a sectional view taken along the line XIV—XIV in FIG. 12.
Figure 15:
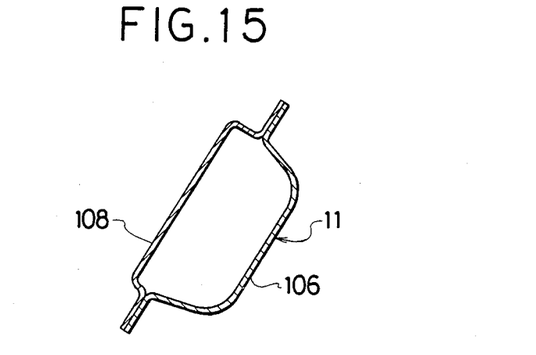
FIG. 15 is a sectional view taken along the line XV—XV in FIG. 14.

Referring to FIGS. 12 and 13, it will be noted that the pillar structure 10 is secured to the front roof panel 7 at the intermediate part. An adhesive 112 may be used to attach the pillar structure 10 to the roof panel 7. At the front and rear edge portions, the front roof panel 7 is formed with reinforcements 7a and 7b to provide an increased rigidity. Referring to FIG. 14, it will be noted that the roof panel 7 is formed at the opposite sides with side reinforcements 7c where the pillar structure 10 is secured to the roof panel 7 by means of screws 114. A weather strip 116 is attached to each side edge of the front roof panel 7 to provide a weather-tight seal between the glasses 100 and 102 and the roof panel 7. Although not shown in the drawings, a similar weather strip is provided on the rear edge of the front header 4 for weather-tight contact with the front edge of the front roof panel 7. The rear roof panel is also provided at the front and side edges with weather strips for engagement with the rear edge of the front roof panel 7 and the upper and rear edges of the rear quarter panel 102.

It will be noted that in the illustrated structure, the pillar structure 10 is covered by the glasses 100 and 102. Further, the rear edge portion 100a of the door glass 100 is flush with the front edge portion 102a of the rear quarter glass panel 102 and in an abutting relationship with the front edge portion 102a. Therefore, the structure can provide a good appearance in the erected positions of the roof panels.

The invention has thus been shown and described taking reference to the accompanying drawings, however, it should be noted that the invention is in no way limited to the details of the illustrated structures but changes and modifications may be made without departing from the scope of the appended claims.

What is claimed is:

1. A convertible vehicle body structure including a front windshield structure having an upper edge, a rear body section having a pair of rear side panel structures provided at the opposite side portions of the rear body section, said rear side structure including an inner panel, said rear side panel structure having an upper edge defining a belt line of the vehicle body structure and a front edge defining a rear edge of a side door opening, a substantially U-shaped swingable pillar structure having a pair of leg portions each being of a closed cross section and pivotably mounted on said inner panel of the side panel structures so that the pillar structure is movable between an upright position wherein it stands from the side panel structures in an inverted U-shaped form and a retracted position wherein it is retracted in the rear body section, a substantially rigid front roof panel having a front edge portion adapted to be removably attached to the upper edge of the front windshield, said front panel being supported by said pillar structure so that said front roof panel is positioned in an extended position wherein the front edge portion of the front roof panel is attached to the upper edge of the front windshield when the pillar structure is in the upright position and retracted in the rear body section when the pillar structure is in the retracted position, a substantially rigid rear roof panel adapted to be positioned to extend between said front roof panel in said extended position and said rear body structure, bracket means for mounting a lower portion of said rear roof panel on said inner panel at each side of the rear body structure for movement between an extended position wherein said rear roof panel is positioned between the front roof panel and the rear body structure and a retracted position wherein said rear roof panel is retracted in the rear body structure, a transparent rear side window adapted to extend upwards from the side panel structure beyond the upper edge of the side panel structure, a side door provided in each of the door openings and having a transparent panel located at an upper portion of the side door, said rear side window being located transversely outside the leg portion of the pillar structure and being substantially flush with the transparent panel when the side door is closed with a front edge of the rear side window extending substantially along a rear edge of the transparent panel of the side door with weather strip means between said front edge of the rear side window and said rear edge of the transparent panel of the side door, said leg portions of the pillar means being spaced transversely inwardly from the weather strip means, said leg portions of the pillar structure being spaced apart transversely inwardly from the weather strip means.

2. A convertible vehicle body structure in accordance with claim 1 in which rear roof panel is provided to cover a portion between a rear edge of the first mentioned roof panel and the rear body section.

3. A convertible vehicle body structure in accordance with claim 1 in which said front roof panel is secured to an intermediate portion of the pillar structure, a motor driven link mechanism being provided to move said pillar structure between said upright position and said retracted position.

4. A convertible vehicle body structure in accordance with claim 2 in which the first mentioned roof panel is secured to an intermediate portion of the pillar structure, a motor driven link mechanism being provided to move said pillar structure between said upright position and said retracted position, a second link mechanism being provided to move said rear roof panel between an extended position wherein it extends between the rear edge of the first mentioned roof panel and the rear body section and a retracted position wherein said rear roof panel is retracted into the rear body section.

5. A convertible vehicle body structure in accordance with claim 4 in which said first and second link mechanisms are interconnected so that the rear roof panel is moved faster than the first mentioned roof panel at an initial stage of movement toward the retracted position.

6. A convertible vehicle body structure in accordance with claim 1 in which the rear edge of the transparent panel of the side door is in abutting relationship with the front edge of the rear side window at a side of the leg portion of the pillar structure.

7. A convertible vehicle body structure including a front windshield structure having an upper edge, a rear body section having a pair of rear side panel structures provided at the opposite side portions of the rear body section, said rear side structure including an inner panel, said rear side panel structure having an upper edge defining a belt line of the vehicle body structure and a front edge defining a rear lower edge of a side door opening, swingable pillar means having a pair of leg portions each being of a closed cross section and pivotably mounted on the interior of said inner panel of the side panel structures so that the leg portions are movable between an upright position wherein they stand upright from the side panel structures and a retracted position wherein they are retracted in the rear body section, a substantially rigid front roof panel having a front edge portion adapted to be removably attached to the upper edge of the front windshield, said front panel being supported by said leg portions of the pillar means so that said front roof panel is positioned in an extended position wherein the front edge portion of the front roof panel is attached to the upper edge of the front windshield when the pillar means is in the upright position and retracted in the rear body section when the pillar means is in the retracted position, a substantially rigid rear roof panel adapted to be positioned to extend between said front roof panel in said extended position and said rear body structure, bracket means for mounting a lower portion of said rear roof panel on said inner panel at each side of the rear body structure for movement between an extended position wherein said rear roof panel is positioned between the front roof panel and the rear body structure and a retracted position wherein said rear roof panel is retracted in the rear body structure, a transparent rear side window adapted to extend upwards from the side panel structure beyond the upper edge of the side panel structure, a side door provided in each of the door openings and having a transparent panel located at an upper portion of the side door, said rear side window being located transversely outside the leg portion of the pillar means and being substantially flush with the transparent panel when the side door is closed with a front edge of the rear side window being in abutting relationship with a rear edge of the transparent panel of the side door with weather strip means between said front edge of the rear side window and said rear edge of the transparent panel of the side door.

8. A convertible vehicle body structure in accordance with claim 1 in which driving means is provided for driving the leg portion of the pillar through first link means and for driving the bracket means through second link means.

9. A convertible vehicle body structure in accordance with claim 7 in which driving means is provided for driving the leg portion of the pillar means through first link means and for driving the bracket means through second link means.

10. A convertible vehicle body structure in accordance with claim 9 in which said first and second link means are interconnected so that the rear roof panel is moved faster than the first mentioned roof panel at an initial stage of movement toward the retracted position.

* * * * *